Patented Oct. 26, 1937

2,096,724

UNITED STATES PATENT OFFICE 2,096,724

ARYL MERCURY ALCOHOLATES OF DYES

Carl N. Andersen, Watertown, Mass., assignor to Lever Brothers Company, a corporation of Maine No Drawing. Application January 22, 1935, Serial No. 2,919

13 Claims. (Cl. 260—13)

The present invention relates to the production of certain new organic mercury compounds, and more particularly to aromatic mercury derivatives of dyes containing a hydroxyl group.

It is an object of my invention to produce new organic mercury compounds useful as germicides and for other therapeutic purposes.

More particularly it is an object of my invention to prepare certain organic mercury compounds which may be regarded as derivatives of dyes.

I have discovered that when certain hydrogen atoms in a dye are replaced by the essential radical of certain aromatic mercury compounds, compounds are produced which have extraordinarily high potency as antiseptics and germicides and at the same time are characterized by relatively low toxicity and other desirable properties.

The compounds constituting the subject-matter of my invention may be described as having the general formula $(RHg)_xR_1$, in which R represents an aromatic structure to a carbon atom of which the mercury is directly attached; in which $x$ is an integer representing the number of aromatic mercury groups in the compound, which integer is at least one and not more than the number of replaceable hydrogen atoms in the radical $R_1$; and in which $R_1$ represents a radical of a dye which is linked to the RHg group or groups through the replacement of one or more hydrogen atoms in the dye. While the words "group" or "groups" are used hereinafter, it is obvious that these words are to be understood as singular or plural depending upon the value of $x$.

More particularly, R represents an aromatic structure which may be an aromatic nucleus with or without side chains, and the expression "aromatic structure" used herein is intended to be generic and include an aromatic nucleus with or without side chains. The aromatic structure is of the type in which none of the nuclear or side chain carbon atoms has direct linkage with any element other than hydrogen, carbon or mercury. R may stand for the phenyl group, $C_6H_5$, or for an aromatic hydrocarbon having a nucleus similar to the phenyl hydrocarbons, as for example, polycyclic hydrocarbons, in which all of the nuclear carbon atoms, other than the one attached to mercury, and any side chain carbon atoms, have their valences satisfied either by carbon or hydrogen. Examples are the diphenyl, tolyl, xylyl, and naphthyl groups.

More particularly, $R_1$ represents a radical of a dye which contains the OH group.

The dyes from which aromatic mercury derivatives may be prepared are of various chemical structures, colors and dyeing properties. I have investigated dyes of many chemical structures, such as the azo (mono and poly) type, xanthine type, pyrazolone type, azine type, anthraquinone type, thiazole type, stilben type, quinoline type, oxazine type, triphenyl methane type, anthraquinoid type, etc., all of which I find may be used to produce aromatic mercury derivatives possessing germicidal properties. By the term "dye" I refer to a chemical compound containing one or more of the "chromophore" groups, and therefore to a compound possessing a characteristic color.

The chemical structure of dyes is very complex and the exact chemical mechanism of the reactions into which they enter is very difficult to determine. In the following paragraphs I have outlined some general principles which should assist in determining the formulae of my novel compounds. However, having disclosed the method by which my new compounds may be produced so as to enable a person skilled in the art to practice my invention, I do not feel obliged to assign a definite chemical formula to every compound within the scope of my invention.

Many dyes possess certain groups which contain a replaceable hydrogen atom. For example, the sulphonic group —$SO_3H$, the carboxyl group —COOH, the hydroxyl group —OH, the sulfonamido group —$SO_2NH_2$, and the —NH group. From my investigations I am inclined to believe that when a dye contains one or more of any of these groups it is the hydrogen atom or atoms thereof that are replaced by the aromatic mercury radical.

In cases in which more than one of the different groups occur in one dye, it is difficult to tell in which group the hydrogen has been replaced by the aromatic mercury radical. Certain general rules should apply. There are exceptions to these rules due to the effect of steric hindrance, and the effect of other groups in the molecule.

However, it is a convenient guide to classification.

The sulfonic acid group is the most acidic and when present in a dye it will usually be the group to react with the aromatic mercury compound. When the dye does not contain a sulfonic group, the carboxyl group is the next most acidic and will be the group to react. If a dye contains neither the sulfonic nor the carboxyl groups, the phenolic hydroxyl is the most reactive. The alcoholic hydroxyl is slightly less reactive than the phenolic. The NH group is usually the least reactive and only reacts when all of the other above mentioned more active groups are absent or do not exist in the free state. The rule regarding the dyes containing the NH group holds true with less regularity, however, as I find some instances where the NH group is quite reactive. This is particularly true of dyes in which the reactivity of the NH group varies greatly with the surrounding groups. The difference in reactivity between the hydroxyl and NH groups is not as pronounced as is the case with the other groups, for example, the carboxyl and the hydroxyl.

When it is desired to replace a particular hydrogen atom by the aromatic mercury radical, it is often necessary to block the substitution in the more reactive groups. For example, when a dye contains both the carboxyl and the sulfonic groups and both are free acids, the aromatic mercury radical will react with the sulfonic group as explained above. If sufficient alkali is added to convert the sulfonic group to an alkali sulfonate leaving the carboxyl group free, then the aromatic mercury radical will react with the carboxyl group. Similarly, when only the carboxyl and hydroxyl groups are free, the aromatic mercury radical reacts with the carboxyl group. If the carboxyl group is converted into a salt, the aromatic mercury radical will react with the hydroxyl group. The same system of blocking may be employed in the case of dyes containing other combinations of the above mentioned radicals.

In many cases the dyes are sold as salts, in which case the hydrogen of one or more groups has been replaced by an alkali metal. When the dye-stuff is available in this form, it is not necessary to use an alkali for converting the acid groups into salts. For example, if a dye contains the SO₃Na, COONa, OH and NH groups, the substitution will be in either the OH or NH groups, depending upon which is the more reactive in that particular compound. In addition, more than one hydrogen atom in similar or different groups may be replaced if desired.

The hydrogen atom of more than one of similar or different groups may be replaced if desired. For example, if the dye contains 2 OH groups or an OH group and an NH group or an SO₃H group and an OH group, the hydrogen of both groups may be replaced if a sufficient quantity of the aromatic mercury compound is employed in the process.

From the above explanation it will be apparent that when a dye contains the OH group the aromatic mercury radical will be attached to this group even though the dye contains one or more of the SO₃Na, COONa and no doubt in most cases the NH groups.

The following examples will illustrate the types of dyes which I may employ in producing the novel aromatic mercury compounds forming the subject of the present invention:

Fast Red B Base (azo type) "Schultz", 7th Ed. #155, "Colour Index" #117.

Rosolic acid (triphenyl methane type) "Schultz" #843, "Colour Index" #724.

Alizarine (anthraquinoid type) "Schultz" #1141, "Colour Index" #1027.

Sudan I (azo type) "Schultz" #33, "Colour Index" #24.

Dianisidin Blue (azo type) "Schultz" #490, "Colour Index" #499 and #500.

The dyes listed above contain only the OH group.

The following dyes contain the OH group and in addition one or more of the SO₃Na, COONa and NH groups:

Diamine Green CA (azo type), "Schultz" #668, "Colour Index" #593.

Chrome Fast Yellow (azo type), "Schultz" #432, "Colour Index" #441.

Diamond Red (azo type), "Schultz" #253, "Colour Index" #216.

Chrome Yellow D (azo type), "Schultz" #230, "Colour Index" #195.

Anthracene Red (azo type), "Schultz" #429, "Colour Index" #431.

Benzo Orange R (azo type), "Schultz" #404, Colour Index" #415.

Benzo Fast Red (azo type), "Schultz" #566, "Colour Index" #278.

Chrysamine L (azo type), "Schultz" #419, "Colour Index" #410.

Diamine Yellow N (azo type), "Schultz" #525, "Colour Index" #488.

Gallocyanine (oxazine type), "Schultz" #998, "Colour Index" #883.

Fastusol Yellow GGA (azo type), "Schultz" #341, "Colour Index" #346.

Dyes which contain the SO₃H group are not listed inasmuch as they constitute part of the subject of my application Serial No. 2,759, filed, January 21, 1935.

Dyes which contain the COOH group are not listed inasmuch as they constitute the subject-matter of my application Serial No. 2,760, filed, January 21, 1935.

The general method of preparing my novel compounds consists in reacting the dye with an aromatic mercury compound of the above mentioned RHg type. Any common solvent in which the reacting components are soluble may be used. The compound resulting from the reaction is often relatively insoluble as compared with the reacting components and upon its precipitation may be filtered, washed and dried. If the compound formed is too soluble to precipitate, the solution may be concentrated and the new compound will crystallize out. For reasons of convenience, one of the more soluble aromatic mercury compounds is selected as a reacting material, such as the hydroxide, or a soluble salt, for example, the acetate or the lactate. The hydroxide has the advantage that in most instances water is the only other compound formed, if any, and the resultant product may be more easily purified.

The following examples are given as illustrative of a method by which all of the dye compounds of the present invention may be prepared and the products prepared are illustrative of representative aromatic mercury dye derivatives falling within the scope of my invention:

*Example I*

17.64 grams of phenylmercury hydroxide is dissolved in 1 liter of alcohol and heated until solution is complete. To this solution is added 14.88 grams of Sudan I ("Schultz" #33, "Colour Index" #24) dissolved in 200 cc. of alcohol. The mixture is heated for a few minutes and filtered. The filtered solution is again heated for a few minutes and allowed to cool. Bright red, well defined and glistening crystals are formed and are separated from the solution by filtration, washed well and dried.

This dye contains only the OH group, the hydrogen of which is believed to be replaced by the phenylmercury radical.

Example II 40.32 grams of phenylmercury acetate is dissolved in 4 liters of water and heated until solution is complete. The solution is filtered to remove any insoluble material. To the filtrate is added 17.52 grams of Rosolic acid dissolved in 100 cc. of alcohol. The solution is heated until it is evaporated to one-half its original volume and then allowed to stand and cool. A reddish powder separates which is removed from the solution by filtration, washed well with water and a few cc. of alcohol and dried.

This dye contains two hydroxyl groups, and due to the quantity of the phenylmercury acetate employed the hydrogen of both hydroxyl groups is believed to be replaced by the phenylmercury radical.

Example III 35.28 grams of phenylmercury hydroxide is dissolved in 2 liters of water and heated until solution is complete. The solution is filtered to remove any insoluble material. To the filtrate is added 40.5 grams of Benzo Fast Red ("Schultz" #566, "Colour Index" 278) dissolved in 500 cc. of alcohol. The mixture is stirred thoroughly and heated for a few minutes to insure completion of the reaction. Upon being allowed to stand and cool a precipitate separates which is removed by filtration, washed well with warm water and dried.

This dye contains in addition to the OH group, the SO₃Na and NH groups. The phenylmercury radical is believed to replace the hydrogen of the hydroxyl group.

Benzo Fast Red has the following formula:

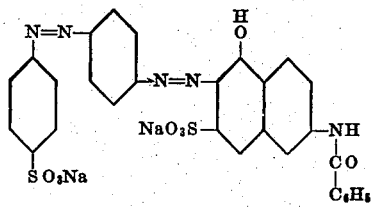

Example IV 17.64 grams of phenylmercury hydroxide is dissolved in 2 liters of water and heated until solution is complete. The solution is then filtered to remove any insoluble material. To the filtrate is added 22.44 grams of Diamine Green CA ("Schultz" #668, "Colour Index" #593) dissolved, or suspended, in alcohol. The mixture is agitated well and heated for a few minutes to insure completion of the reaction. On cooling, dark green crystals separate which are removed by filtration, washed well with warm water and a few cc. of alcohol and dried.

This dye, in addition to the OH group, contains the SO₃Na group. It is the hydrogen of the hydroxyl group which is believed to be replaced by the phenylmercury radical.

Example V 17.64 grams of phenylmercury hydroxide is dissolved in 2 liters of water and heated until solution is complete. To the filtrate is added an aqueous solution or suspension containing 28.56 grams of Diamond Red ("Schultz" #253, "Colour Index" #216). The mixture is heated for a few minutes to insure completion of the reaction. Upon being permitted to stand and cool reddish crystals separate which may be removed by filtration, washed well and dried.

This dye, in addition to the OH group, contains the SO₃Na and COONa groups. It is the hydrogen of the hydroxyl radical which is believed to be replaced by the phenylmercury radical.

Diamond Red has the following formula:

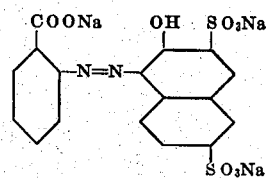

Example VI 20.16 grams of phenylmercury acetate is dissolved in 1 liter of water and heated until solution is complete. The solution is filtered to remove any insoluble material. To the filtrate is added 14.1 grams of Chrysamine L ("Schultz" #419, "Colour Index" #410) suspended in water. The mixture is heated for a few minutes to insure completion of the reaction. Upon being permitted to stand and cool, a fine yellowish crystalline mass separates. This is removed by filtration, washed and dried.

This dye, in addition to the OH group, contains the COONa group. It is the hydrogen of the hydroxyl radical which is believed to be replaced by the phenylmercury radical.

Chrysamine L has the following formula:

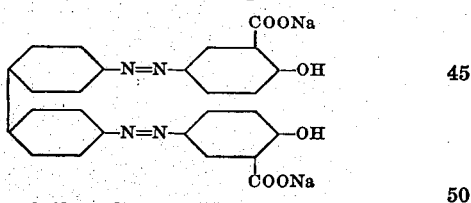

In each of the above examples the reacting materials are employed in substantially theoretical quantities. In certain instances, if desired, an excess, say 10% of the dye may be employed in order to assure the complete conversion of the aromatic mercury compound.

From the description of these specific examples it will be readily apparent to one skilled in the art how other dyes of the type above described may be reacted with an aromatic mercury compound to produce aromatic mercury dye derivatives.

The operativeness of the process is not found to depend in any degree upon the temperature at which the reaction is effected. It is convenient to use heat because it facilitates the solution of the reacting components and in some cases speeds the reaction, but the process can be carried out at any temperature, for example, room temperature. The process may be carried out in any solvent, in which both reacting components are soluble. Water is usually employed for reasons of convenience, but any other material which does not enter into the reaction and in which the materials are soluble, may be used, for example, one of the alcohols, acetone or mixtures of these with each other or water.

All of the compounds produced as above described are characterized by extraordinarily high potency as germicides. Tests to determine the efficacy of certain of them in killing *B. Typhosus* and *Staph. aureus* were carried on under the following conditions:

Aqueous solutions of varying dilutions from 1:10,000 upward until killing ceased, were made up.

These dilutions were employed in the conduct of the tests by the following methods:

Circular 198, U. S. Dept. of Agriculture, Dec. 1931, described as F. D. A. method against *Eberthella typhi* (typhoid baccillus) at 37° C. and F. D. A. Special Method against *Staph. aureus* at 37° C.

As illustrative of the potency of the compounds, the killing power of the following compounds is given merely as illustrative:

The figures represent the maximum dilutions at which killing in 15 minutes resulted:

|  | B. typhosus | Staph. aureus |
|---|---|---|
| Phenylmercury derivative of Rosolic Acid | 1:50,000 | 1:30,000 |
| Phenylmercury derivative of Benzo Fast Red | 1:100,000 | 1:40,000 |
| Phenylmercury derivative of Chrysamine L | 1:100,000 | 1:62,500 |

In addition to their high germicidal value, all of these compounds are characterized by relatively low toxicity. Because of these properties it is possible to use them in extreme dilutions and in many situations where known germicides, because of toxic or other undesired properties, cannot be employed. They may be used externally and locally with satisfactory results from the germicidal standpoint and without harmful effect to the body or its functions.

The compounds retain their germicidal activity when incorporated in soap and various menstrums employed in preparing germicidal compositions.

When these new compounds are to be used directly as germicides they may be employed in aqueous or other solutions or they may be formed into various preparations such as mouth washes, tooth pastes, soaps, ointments, etc.

I claim:

1. A new organic mercury compound of the general formula $(RHg)_x.R_1$, in which R represents an aromatic structure to a carbon atom of which the mercury is directly attached, and in which none of the carbon atoms has direct linkage with any element other than hydrogen, carbon or mercury; in which $R_1$ represents a radical of a dye containing a hydroxyl group, which radical is linked to an RHg group by the replacement of a hydroxyl hydrogen atom; and in which $x$ is an integer representing the number of RHg groups in the compound, which integer is at least one and not more than the number of hydroxyl hydrogen atoms in the radical $R_1$.

2. A new organic mercury compound of the general formula $(RHg)_x.R_1$, in which R represents an aromatic structure to a carbon atom of which the mercury is directly attached, and in which none of the carbon atoms has direct linkage with any element other than hydrogen, carbon or mercury; in which $R_1$ represents a radical of a dye selected from the group consisting of dyes containing a hydroxyl group and one of the $SO_3Na$, COONa and NH groups, which radical is linked to an RHg group by the replacement of a hydroxyl hydrogen atom; and in which $x$ is an integer representing the number of RHg groups in the compound, which integer is at least one and not more than the number of hydroxyl hydrogen atoms in the radical $R_1$.

3. A new organic mercury compound of the general formula $(RHg)_x.R_1$, in which R represents an aromatic structure to a carbon atom of which the mercury is directly attached, and in which none of the carbon atoms has direct linkage with any element other than hydrogen, carbon or mercury; in which $R_1$ represents a radical of a dye containing hydroxyl, $SO_3Na$ and COONa groups, which radical is linked to an RHg group by the replacement of a hydroxyl hydrogen atom; and in which $x$ is an integer representing the number of RHg groups in the compound, which integer is at least one and not more than the number of hydroxyl hydrogen atoms in the radical $R_1$.

4. A new organic mercury compound of the general formula $(RHg)_x.R_1$, in which R represents an aromatic structure to a carbon atom of which the mercury is directly attached, and in which none of the carbon atoms has direct linkage with any element other than hydrogen, carbon or mercury; in which $R_1$ represents a radical of a dye containing hydroxyl and $SO_3Na$ groups, which radical is linked to an RHg group by the replacement of a hydroxyl hydrogen atom; and in which $x$ is an integer representing the number of RHg groups in the compound, which integer is at least one and not more than the number of hydroxyl hydrogen atoms in the radical $R_1$.

5. A new organic mercury compound of the general formula $(RHg)_x.R_1$, in which R represents an aromatic structure to a carbon atom of which the mercury is directly attached, and in which none of the carbon atoms has direct linkage with any element other than hydrogen, carbon or mercury; in which $R_1$ represents a radical of a dye containing hydroxyl and COONa groups, which radical is linked to an RHg group by the replacement of a hydroxyl hydrogen atom; and in which $x$ is an integer representing the number of RHg groups in the compound, which integer is at least one and not more than the number of hydroxyl hydrogen atoms in the radical $R_1$.

6. A new organic mercury compound of the general formula $(C_6H_5Hg)_x.R_1$, in which $R_1$ represents a radical of a dye containing a hydroxyl group, which radical is linked to the $C_6H_5Hg$ group by the replacement of a hydroxyl hydrogen atom; and in which $x$ is an integer representing the number of $C_6H_5Hg$ groups in the compound, which integer is at least one and not more than the number of hydroxyl hydrogen atoms in the radical $R_1$.

7. A new organic mercury compound of the general formula $(C_6H_5Hg)_x.R_1$, in which $R_1$ represents a radical of a dye selected from the group consisting of dyes containing the hydroxyl group and one of the $SO_3Na$, COONa and NH groups, which radical is linked to a $C_6H_5Hg$ group by the replacement of a hydroxyl hydrogen atom; and in which $x$ is an integer representing the number of $C_6H_5Hg$ groups in the compound, which integer is at least one and not more than the number of hydroxyl hydrogen atoms in the radical $R_1$.

8. A new organic mercury compound of the general formula $(C_6H_5Hg)_x.R_1$, in which $R_1$ represents a radical of a dye containing hydroxyl, $SO_3Na$ and $COONa$ groups, which radical is linked to a $C_6H_5Hg$ group by the replacement of a hydroxyl hydrogen atom; and in which $x$ is an integer representing the number of $C_6H_5Hg$ groups in the compound, which integer is at least one and not more than the number of hydroxyl hydrogen atoms in the radical $R_1$.

9. A new organic mercury compound of the general formula $(C_6H_5Hg)_x.R_1$, in which $R_1$ represents a radical of a dye containing hydroxyl and $SO_3Na$ groups, which radical is linked to a $C_6H_5Hg$ group by the replacement of a hydroxyl hydrogen atom; and in which $x$ is an integer representing the number of $C_6H_5Hg$ groups in the compound, which integer is at least one and not more than the number of hydroxyl hydrogen atoms in the radical $R_1$.

10. A new organic mercury compound of the general formula $(C_6H_5Hg)_x.R_1$, in which $R_1$ represents a radical of a dye containing hydroxyl and $COONa$ groups, which radical is linked to a $C_6H_5Hg$ group by the replacement of a hydroxyl hydrogen atom; and in which $x$ is an integer representing the number of $C_6H_5Hg$ groups in the compound, which integer is at least one and not more than the number of hydroxyl hydrogen atoms in the radical $R_1$.

11. A phenylmercury alcoholate of the dye Chrysamine L, which dye has the formula:

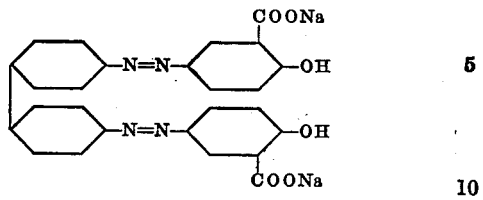

12. Phenylmercury alcoholate of the dye Benzo Fast Red, said dye having the formula:

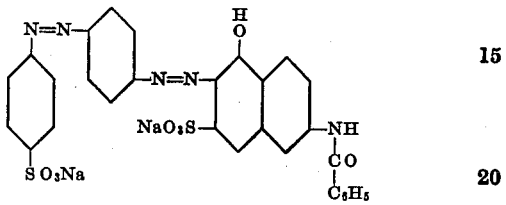

13. Phenylmercury alcoholate of the dye Diamond Red, said dye having the formula:

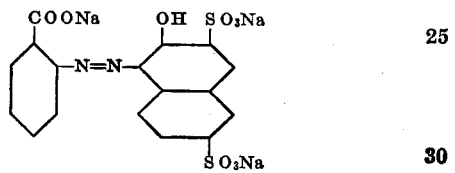

CARL N. ANDERSEN.